US006466571B1

(12) United States Patent
Dynarski et al.

(10) Patent No.: US 6,466,571 B1
(45) Date of Patent: Oct. 15, 2002

(54) RADIUS-BASED MOBILE INTERNET PROTOCOL (IP) ADDRESS-TO-MOBILE IDENTIFICATION NUMBER MAPPING FOR WIRELESS COMMUNICATION

(75) Inventors: Richard J. Dynarski, Glen Ellyn, IL (US); Matthew Harper, Arlington Heights, IL (US); Yingchun Xu, Buffalo Grove, IL (US); Andrew Bezaitis, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/233,401

(22) Filed: Jan. 19, 1999

(51) Int. Cl.[7] .............................................. H04L 12/66
(52) U.S. Cl. ........................ 370/352; 370/389; 455/567
(58) Field of Search ................................. 455/567, 436, 455/461, 432, 433, 440; 709/217, 218, 219, 225, 249; 370/338, 352, 401, 389; 340/7.29

(56) References Cited

U.S. PATENT DOCUMENTS

| | | | |
|---|---|---|---|
| 5,325,419 A | | 6/1994 | Connolly et al. ............. 379/60 |
| 5,438,614 A | | 8/1995 | Rozman et al. ............... 379/93 |
| 5,442,633 A | * | 8/1995 | Perkins et al. ............. 370/94.1 |
| 5,528,595 A | | 6/1996 | Walsh et al. ............. 378/85.13 |
| 5,598,536 A | * | 1/1997 | Slaughter, III et al. . 395/200.16 |
| 5,793,762 A | | 8/1998 | Penners et al. ............. 370/389 |
| 6,018,657 A | * | 1/2000 | Kennedy, III et al. ...... 455/426 |
| 6,195,705 B1 | * | 2/2001 | Leung ........................ 370/331 |
| 6,272,129 B1 | * | 8/2001 | Dynarski et al. ............ 370/352 |
| 6,407,988 B1 | * | 6/2002 | Agraharam et al. ........ 370/328 |

FOREIGN PATENT DOCUMENTS

| | | |
|---|---|---|
| WO | WO 98/32301 | 7/1998 |
| WO | WO 99/01969 | 1/1999 |

OTHER PUBLICATIONS

Request for Comments (RFC) 2002, C. Perkins, editor (Oct. 1996).

* cited by examiner

*Primary Examiner*—Dwayne Bost
*Assistant Examiner*—Miguel D. Green
(74) *Attorney, Agent, or Firm*—McDonnell Boehnen Hulbert & Berghoff (57) ABSTRACT

A method of finding a mobile wireless communications device when an Internet Protocol (IP) packet from a remote user is sent to the device over an IP network. The mobile device does not have to register with the IP network in order to receive the IP. The method comprises the steps of receiving the IP packet at a home agent associated with a wireless communications network. The IP packet includes an IP address assigned to the device. If there is no current mobility binding record for the mobile device, instead of dropping the packet the home agent sends an access-request packet, containing the IP address, to an authentication server. The authentication server, e.g., a RADIUS server, maintains a table mapping the IP address for the device to an identification number uniquely associated with the device, such as the device's International Mobile Subscriber Identity number. The authentication server sends an access-accept packet to the home agent in the event that the device is authorized to receive the IP packet, in which case the access-accept packet includes the identification information. The home agent uses the identification number to locate, page and automatically connect the wireless device to the IP network via an InterWorking Unit (IWU) configured as a IP network access server.

11 Claims, 7 Drawing Sheets

IWU = nMCP CARD SETS 50/52+ MARC CARD SET 58/60

RADIUS-BASED MOBILE INTERNET PROTOCOL (IP) ADDRESS-TO-MOBILE IDENTIFICATION NUMBER MAPPING FOR WIRELESS COMMUNICATION

BACKGROUND OF THE INVENTION

A. Field of the Invention

This invention relates to the fields of telecommunications and wireless Internet Protocol (IP) network routing. More particularly, the invention relates to a process by which a mobile communications device, for example, a laptop computer equipped with a cellular telephone modem, is located and communication between the device and a terminal on an IP network is initiated.

B. Description of Related Art

Wireless communications networks offer much flexibility to the user, in that they allow users of portable communications devices, such as personal digital assistants, laptop computers, telephones, and other appliances to get connected to the public switched telephone network from any location within the region served by the wireless network. Connolly et al., U.S. Pat. No. 5,325,419, discloses a personal communication system by which a user uses an RF link to communicate with an intelligent base station. The intelligent base stations provide radio access along with an Integrated Services Digital Network (ISDN) interface to the public switched telephone network. The PSTN aspect of the system has three components: a personal communications switching center, where telephone central office switches have certain characteristics, a signaling transfer point, and a service control point where an intelligent data base exists maintaining certain user features and records.

The patent application of Yingchun Xu, et al., Ser. No. 08/887,313, assigned to the assignee of the present invention and which is fully incorporated by reference herein, describes a system by which a wireless communications device such as laptop computer with a cellular modem may access a packet-switched (e.g., IP) data network such as a corporate backbone network or the Internet. In the Xu et al. system, a frame relay line connected to the wireless network couples the remote wireless user to the packet-switched network via an all-digital network access server. This type of network access server is occasionally known in the art as an InterWorking Unit (IWU) and the two terms are occasionally used interchangeably herein. The network access server provides an interface to the frame relay line and wireless network and an interface (including router functionality) to the packet switched network. The Xu et al. application further discloses certain accounting and routing techniques that permit network access to authorized users, while at the same time providing convenient authorization and accounting techniques to be performed by the entity operating the network access server. Network access servers suitable for use as a platform for an IWU are, per se, known in the art and commercially available from companies such as 3Com Corporation. They are also described in the patent literature. See, e.g., the patent awarded to Dale M. Walsh et al., U.S. Pat. No. 5,528,595, incorporated by reference herein.

In the prior art, the mobile device typically must dial into the IP network through a network access server or otherwise register with an InterWorking Unit or gateway router/home agent in order to gain access to the IP network and communicate with a remote terminal on the network. If a terminal on the network were to attempt to initiate communication with the mobile device on its own, the terminal on the network and/or other communications elements in the IP network or wireless network would have to know several things: where the mobile terminal is located, whether it was within range of the wireless network, whether it was ready to receive the data (i.e., booted up), and possibly still other pieces of information, such as the information uniquely identifying the device in the wireless network such as its International Mobile Subscriber Identity (IMSI) number and/or its Electronic Serial Number (ESN). Obviously, this circumstance makes it quite cumbersome, if not impossible, for a terminal on the IP network to initiate communication with an unregistered, wireless mobile communications device. For example, if a home agent for the mobile device receives an incoming IP packet for the device but does not have a record of where the device is located (e.g., a mobility binding record indicating where to send the packets received from the terminal), it would simply drop the packets.

The present invention attempts to overcome these problems and provide a simple, efficient and automatic way of finding a mobile user when an IP packet is addressed to them. Once located, the method allows the terminal on the IP network to initiate communication with the mobile wireless communications device. In one possible embodiment, the invention uses the paging ability of the wireless network to locate the wireless mobile communications device whenever a terminal on the IP network attempts to send a packet whose IP destination address matches that of the mobile device. When the mobile device responds to the page it automatically becomes connected to the IP network and is able to communicate with the remote terminal.

SUMMARY OF THE INVENTION

A method is provided for finding a mobile wireless communications device when an Internet Protocol (IP) packet from a remote user over an IP network is send to the device. The method comprises the steps of receiving the IP packet at a home agent associated with a wireless communications network. The IP packet includes an IP address assigned to the device. In the present example, the home agent does not have a mobility binding record in order to route the packet to the mobile device. Instead of dropping the packet, the home agent sends an access-request packet to an authentication server containing the IP address of the device. The authentication server maintains a table mapping the IP address for the device to an identification number uniquely associated with said device, such as the device's IMSI/ESN number. The entries in the table are populated manually (or otherwise) by the provider of the IP network access service for the wireless device.

In the event that the device is authorized to receive the IP packet, e.g., it is a current subscriber to the service and its bills are paid, the authentication server sends an access-accept packet to the home agent. The access-accept packet includes the identification number for the device. In response to the receipt of the access-accept packet, the home agent uses the identification number to alert the device that an incoming IP packet has been received to thereby initiate communication between the device and the remote user. For example, the home agent initiates a page of the device through the wireless network, or uses a signaling system 7 network to locate the device and initiate the page. When the device responds to the page, the device becomes connected via an InterWorking Unit to the IP network and communication between the device and the remote terminal can proceed.

The nature of the wireless mobile communications device is not important. It could be a personal digital assistant device, laptop computer, or any other type of device that is capable of communication over an IP data network with a remote terminal.

In another aspect of the invention, a wireless communication service provider system is described. The system includes a home agent for a plurality of mobile communications devices, a network access server (IWU) connected to the home agent over a local area network, and an authentication server connected to both the home agent and the network access server. The network access server provides access for a mobile communications device to an Internet Protocol (IP) network, such as for example a corporate backbone network or the internet. The authentication server maintains a table mapping Internet Protocol (IP) addresses for the mobile communications devices to identification information uniquely associated with the devices, such as the IMSI/ESN numbers. When the home agent receives an IP packet containing an IP address assigned to the device from a remote user, and does not have a mobility binding record for the device, it responsively sends an access-request packet containing the IP address to the authentication server. The authentication server (e.g., a RADIUS server) responsively sends an access-accept packet to the home agent in the event that the device is authorized to communicate with the remote user. The access-accept packet includes the identification information. The home agent uses the identification information to locate, page and automatically connect the device via the network access server to the IP network and thereby provide communication between the device and the remote user over the IP network.

In yet another aspect of the invention, an authentication server for a wireless communications network is provided. The authentication server is coupled to a home agent receiving an Internet Protocol (IP) packet from a remote user destined for a mobile communications device. The authentication server comprises a memory containing a table mapping an IP address contained in the IP packet to an identification number for the device, and a central processing unit processing an access-request packet containing the IP address from the home agent. The authentication uses the table to determine whether the device is authorized to receive the IP packet. The authentication server further has a software program running on the central processing unit that generates an access-accept packet and issues the access-accept packet to the home agent in the event that the authentication server authenticates the device with the table.

BRIEF DESCRIPTION OF THE DRAWINGS

In the following description, reference will be made to the appended drawings, where like reference numerals refer to like elements in the various figures, and wherein.

DETAILED DESCRIPTION OF THE PREFERRED AND ALTERNATIVE EMBODIMENTS OF THE INVENTION

Figure 1A:
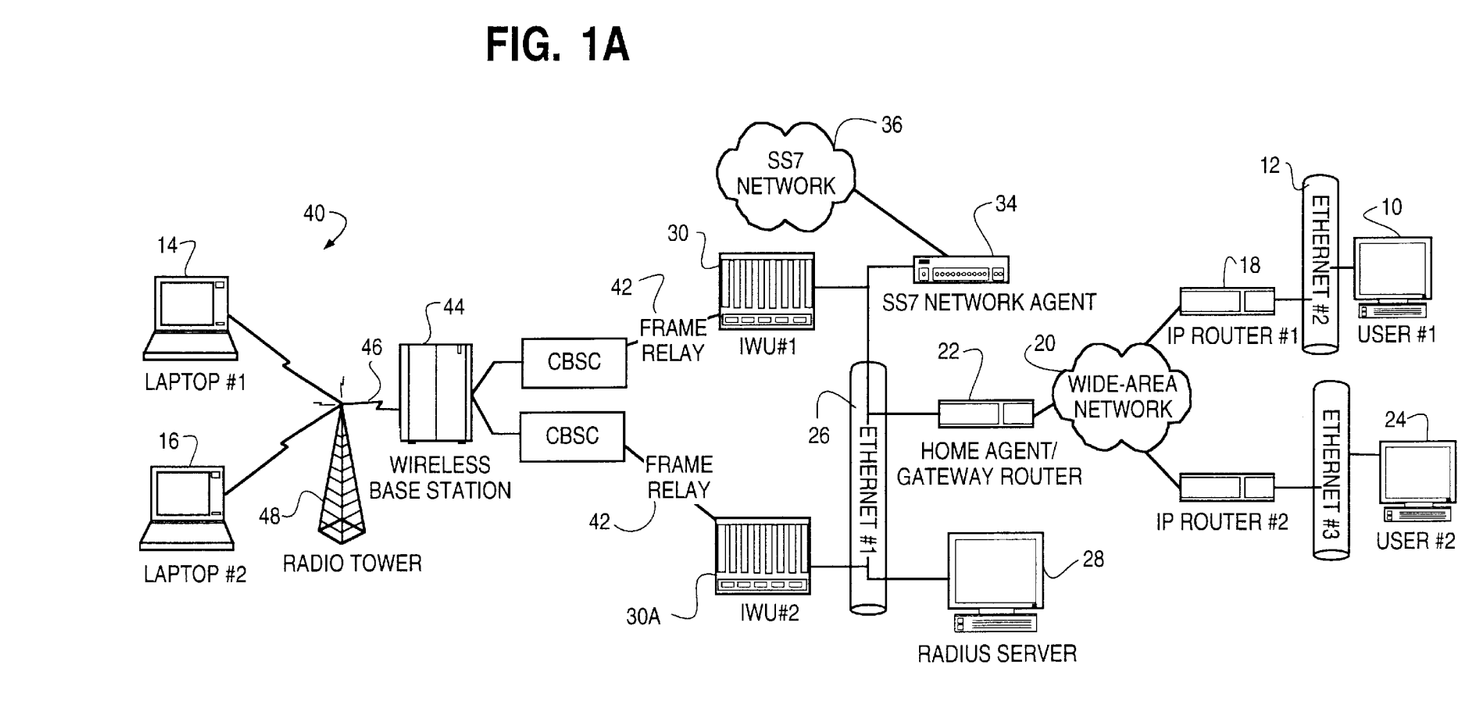
FIG. 1A is a schematic illustration of the communications architecture that may be used to link a remote terminal on a packet-switched network and a user operating a mobile wireless communications device such as a laptop computer equipped with a cellular telephone modem, and in particular showing the relationship between the home agent, authentication server, a plurality of network access servers functioning as InterWorking Units that link the wireless communications network to an IP LAN and packet switched network, and Signaling System 7 network.

Referring now to FIG. 1A, a situation may occur in which a user, for example, a person operating a personal computer 10 on a corporate backbone network 12, may wish to exchange information or data with one or more users of mobile wireless communications devices, such as the users operating laptop computer 14 or laptop computer 16. Similarly, the user of computer 24 may want to communicate with users operating laptop computer 14 or laptop computer 16.

The present invention provides for an ability of the communications system of FIG. 1 to locate the laptop computer 14 and route packets from PC 10 to the laptop computer 14. In accordance with the invention, we provide a method of connecting a mobile wireless communications device (e.g., laptop 14) to an IP network such as networks 12 or 20. The wireless communications device 14 is a subscriber to a wireless communications network 40. The method involves the step of authenticating the device 14 to determine whether the device is authorized to receive an IP packet from a terminal (e.g., 10) connected either directly or indirectly to the IP network. A preferred method of performing this step is described in detail below. If the device 14 is authenticated and authorized to receive the IP packet (i.e., is a current, paid up subscriber to the wireless network 40 service), a search is performed with a location server for an existing mobile IP address for routing the IP packet to the device. If the searching results in a negative outcome, the device 14 is paged via the wireless communications network 40. When the device 14 responds to the page, the device becomes connected to the IP network 20/12 via a network access server or InterWorking Unit (e.g., 30) coupling the wireless communications network 40 to the IP network 20/12. Thus connected, the device 14 may receive the IP packet and initiate communication via the IP network 20/12 with the source of the IP packet, remote terminal 10.

In the illustrative embodiment of FIG. 1A, the backbone network 12 comprises an IP local area network (such as an Ethernet network) which is coupled by an IP router 18 to a wide area IP network 20 such as the Internet. When an IP packet is generated by the PC 10 destined for the laptop computer 14, the IP protocol requires a destination address field in the packet corresponding to the device 14. This address field will result in the call being forwarded over the IP network 20 to a home agent 22 for the device 14. The home agent 22 comprises a gateway/router, which may be a router on the IP network 20, which acts as mechanism for coordinating the receipt and transmission of communication sessions for the device 14 from multiple remote terminals, such as terminals 10 or 24. The home agent 22 also performs these functions for a plurality of mobile wireless communications devices, such as laptop computers 14 and 16. The problem arises in how to route the IP packet from the terminal 10 (or 24) to the destination device, particularly where the home agent does not have any information as to where the device 14 is located. For example, the home agent 22 may not have a mobility binding record or other data from which an IP address is assigned to the device 14 which can be used to route the IP packet to the laptop 14. This situation may occur if the device has not been active in recent past, has moved into or out of the area, etc. In accordance with the present invention, the mobile device need not be registered with the IP network (e.g., at the home agent) in order to receive call an incoming IP packet from the remote terminal.

In a preferred embodiment, the home agent 22 comprises a router that is coupled to local area network (LAN) 26 on which resides an authentication server 28, one or more InterWorking Units 30 (network access servers coupling the wireless network to the local area network and IP network), and a Signaling System 7 network agent 34 coupling the local area network 26 to a Signaling System 7 network 36. The functionality of the home agent could also be incorporated into other types of devices, and even a general purpose computer on the LAN 26, and the particular manner in which the home agent is embodied is not particularly important. Further details on the functionality of the home agent can be found in the Request for Comments (RFC) 2002 document, which is incorporated by reference herein, a publicly available document familiar to persons skilled in this art.

The authentication server 28, in a preferred embodiment, comprises a general purpose computer functioning as a RADIUS server (a known device) providing accounting, authorization and authentication functions for a plurality of mobile users 14 and 16. Among other things, the authentication server 28 maintains a table in a memory that maps a destination IP address found in the IP packet from the remote terminal 10 or 24 destined for the wireless device 14 with information uniquely identifying the device 14 or 16 that is being "called" by the remote terminal, such as the IMSI/ESN number assigned to the wireless device 14. The authentication server has a central processing unit processing an access-request packet containing the IP address from the home agent 22. The authentication server 28 uses the table to determine whether the device 14 is authorized to receive the IP packet. The authentication server 28 further has a software program running on the central processing unit that generates an access-accept packet and issues the access-accept packet to the home agent 22 in the event that the authentication server authenticates the device 14 with the table.

In a preferred embodiment, the authentication server 28 determines from the IP address or IMSI or ESN number a particular network to use to locate the device, such as the local area network 26 or the Signaling System 7 network 36. The authentication server 28 returns a vendor-specific attribute which informs the home agent 22 whether to use the LAN 26 or the SS7 network to find the mobile device 14.

The InterWorking Units 30, in a preferred embodiment, comprise network access servers of the type generally described in the above-cited Walsh et al. '595 patent, with the telephone line interfaces modified as necessary to accommodate frame relay lines for transmitting data to and from a wireless communications system indicated generally by reference number 40. Further details on a presently preferred implementation will be explained later in this document.

The network access servers 30 are coupled to a frame relay line 42 which is linked to a wireless base station 44 via a Central Base Station Controller (CBSC). Known and conventional additional equipment in the wireless network 40, such as mobile switching centers, may be present but are omitted from the illustration. The CBSCs multiplex a plurality of channels from multiple wireless devices on the frame relay line for transmission to the network access servers 30 and 30A. The wireless base stations transmits and receives data to and from the wireless devices via radio frequency links 46 to a radio tower 48 and radio frequency links from the tower 48 to the devices 14 and 16. The particular manner and details by which the wireless system 40 operates is not a part of the invention and may be in any known manner, and may for example, be in accordance with known cellular telephone techniques (digital or otherwise) or may be in accordance with the teachings of the above-referenced personal communications system described in the Connolly et al. reference, U.S. Pat. No. 5,325,419. One attribute that the wireless communications network 40 should have, however, is the ability to page the wireless communications device 14. Paging of wireless communications devices is a known technology to those of ordinary skill in the art, and hence will not be described in further detail in this document.

The CBSC of FIG. 1A is maintained and operated by the provider of the wireless communication service for the mobile nodes 14 and 16. The CBSC multiplexes a plurality of calls (e.g., twenty three) onto an Integrated Services Digital Network Primary Rate Interface (ISDN PRI) T1 line and directs the data to the network access server 30. The CBSC also initiates a page of the mobile node 14, 16 over the wireless network 40 using a mobile switching center, base station 44 and a radio tower 48. The connection between the CBSC and the network access server 30 could also use some other technology such as Asynchronous Transfer Mode (ATM).

The SS7 network agent 34 is a known device which is connected to the SS7 network on one side and the LAN on the other side. It maps messages received from the LAN side into SS7 messages to deliver to SS7 network elements, for example, a signaling transfer point, network control point or signal control point. The SS7 network has the ability much like a RADIUS server. It can authenticate using various attributes received in SS7 signaling message to access a database and authenticate a user to access the network. It can also deliver SS7 signaling messages to the home agent 22 on the LAN. The SS7 agent 34 thus allows the SS7 network to control a data network in addition to its current role, i.e., of controlling access to the worldwide public switched telephone network.

A presently preferred method by which a mobile wireless communications device (e.g., laptop computer 14) is automatically located and connected to the packet-switched network 20 and ultimately the remote terminal 10 will now be described. First, an Internet Protocol (IP) packet from a terminal 10 on the network 12 and destined for the device 14 is relayed by router 18 onto the WAN 20 where it is received by the home agent 22. At this point, the home agent 22 detects that it does not have a mobility binding record which can be used to route the packet to the device 14, since, for example, there is no current IP session in progress between the device 14 and the home agent 22. Instead of dropping the packet, as would normally be the case in the prior art, the home agent then transmits an Access-Request message to the authentication server 28 for authentication. The Access-Request message includes the destination IP address for the wireless device 14 that was included in the IP packet from the terminal 10 on the network. The purpose of the Access-Request message is to authenticate the user who owns device 14 to be sure that they are allowed to receive the call, e.g., that they are a current subscriber with the wireless network 40, their bill is not in arrears, etc.

The authentication server 28 responsively issues an Access-Accept message to the home agent 22 if the device 14 is authorized to receive the IP packet. The authentication server (e.g., RADIUS server) 28 authenticates the user operating the device 14 using the Destination IP address in the packet received from the remote terminal 10. The Access-Accept packet includes the IMSI/ESN number for the remote device in RADIUS attributes Callback-number and Callback-ID or through two newly-defined RADIUS attributes, Mobile-IMSI and Mobile-ESN. The mapping of Destination IP address to IMSI/ESN is done by the authentication server using a table populated in any convenient fashion, such as by manual input of the values by an operator of the wireless/IP network service. The Access-Accept message also includes information identifying a particular network to use to locate the device, such as the local area network or the Signaling System 7 network.

In the event that the Access-Accept message specifies that the local area network 26 is to be used to locate the mobile device 10, the home agent 22 transmits a message, such as an Address Resolution Protocol (ARP) packet containing the IMSI/ESN number or other information uniquely identifying the device 14, on the designated network (e.g., Ethernet network 26) to a device, such as a general purpose computer or other device incorporating a general purpose computer, that functions as mobile node location server. In a preferred embodiment, one of the network access servers (e.g., 30) on the LAN is configured to be the mobile node location server that has a general purpose computing platform embedded therein, such as the Total Control Enterprise Network Hub equipped with one or more HyperArc routing cards, commercially available from 3Com Corporation.

The mobile node location server 30 maintains a table mapping current IP addresses for a plurality of mobile communication devices 14, 16 to the information uniquely identifying the devices. The server 30 listens to all Address Resolution Protocol (ARP) packets broadcast on the network 26. When it receives an ARP request (e.g., from the home agent 22) it checks a table it keeps mapping Mobile Node 14 IP address to IMSI/ESN numbers. In the event that the IMSI/ESN number for the device is not found by the mobile node location server 30 in the table, indicating that the device 14 is not currently registered with or communicating with the IP network and has no current, useable IP address to route packets to the device 14, the mobile node location server 30 responsively initiates a page of the device 14 via the wireless communications network. The page may contain several pieces of information, such as the source IP address of the remote terminal 10, a service option specifying data or voice over IP service, etc.

When the device 14 receives the page, it then knows that a terminal on the IP network is trying to reach it. When the device responds to the page, it initiates a connection with the IP network 12/20/26, by virtue of an established PPP connection between one of the network access servers 30 on the LAN 26 (which could also be the network access server acting as the mobile node location server) and the mobile switching center and base station in the wireless network. The network access server (also known as a Foreign Agent) that couples the wireless mobile device to the IP network then issues a Gratuitous or Unsolicited ARP response which is received by the mobile node location server 30. The mobile node location server enters that information into its table mapping Mobile Node IP address to IMSI/ESN numbers in the event that an IP packet is sent by a different terminal (e.g., terminal 24 destined for the device 14).

The IP address associated with the IP link between the network access server 30 and the wireless device 14 is forwarded to the home agent 22 to enable the IP packet from the remote terminal 10 to be properly routed through network 26 to the network access server, e.g. through network access server 30A. At this point a PPP session between the device 14 and the network access server 30A is established, and communication between the device 14 and the terminal 10 on the network 12 may be accomplished and the IP packet may be received by the mobile wireless communications device 14.

In the event that the authentication server 28 specifies to the home agent 22 that a Signaling System 7 network 36 is to be used to locate the mobile device 14, the process proceeds in an analogous fashion. The home agent 22 transmits a query message to a home location register node (not shown, but analogous to the mobile node location server 30) through the Signaling System 7 network 36. Basically, the query seeks registration, location and routing information for the mobile device 14. The home location register node replies to the home agent 22 with location information for the device 14, such as the mobile device's temporary local directory number. At this point, the home agent 22 sends a call set-up message to a destination mobile switching center (not shown) in the wireless network 40 using the mobile device's location information to trigger a page of the device 14.

When the device 14 responds to the page it gets connected via the wireless communications network 40 to one of the network access servers coupled to the home agent 22 over the LAN 26. For example, when the device 14 responds to the page it initiates a connection via the wireless network 40 to the network access server or IWU 30. The network access server 30 then issues a Gratuitous or Unsolicited ARP response which is also detected by the Mobile Node Location Server or network access server 30A, which then enters that information into it's table mapping Mobile Node IP addresses to IMSI/ESN numbers in the event that another terminal on the IP network sends an IP packet to the wireless device 14. The home agent 22 is notified of the IP address associated with the connection between network access server 30 and mobile device 10 and routes the IP packet from the remote terminal 10 to the device 14.

Figure 1B:
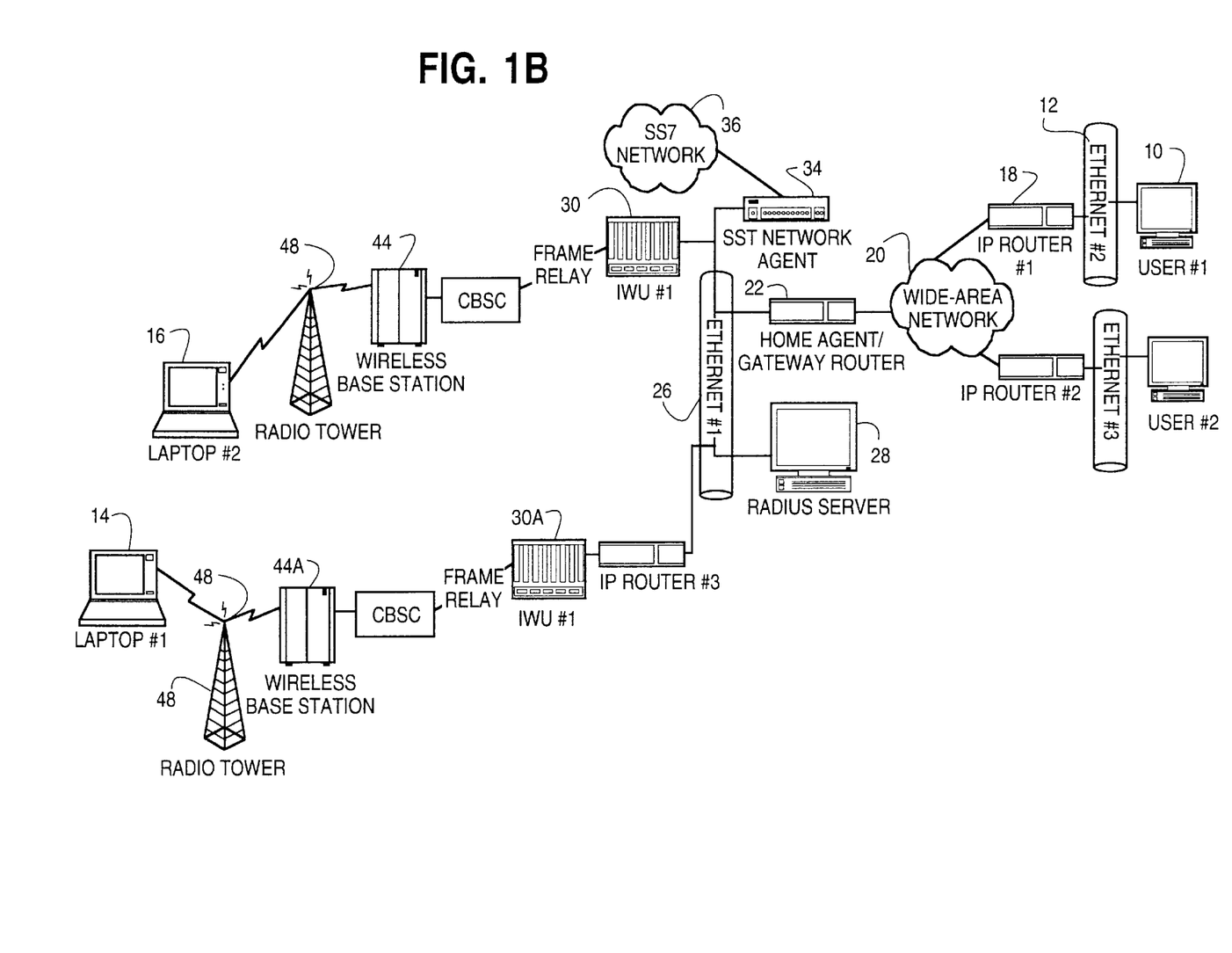
FIG. 1B is a schematic illustration of the communications architecture that may be used to link a remote terminals on a packet-switched network and a user operating a mobile wireless communications device such as a laptop computer equipped with a cellular telephone modem, in which the network access server connecting the mobile user to the IP network is not on the same as LAN as the home agent.

Referring now to FIG. 1B, in the case that the home agent 22 is not on the same LAN as the network access server/IWU/Foreign Agent 30A, a message will be sent from the home agent 22 to network access server/IWU/Foreign Agent 30A to trigger the paging process. The network access server/IWU/Foreign Agent 30A sends a call setup message to a base station 44A or mobile switching station in the wireless network 40 to page the mobile device 14. The message sent from the home agent 22 to the network access server/IWU/Foreign Agent will include all the information required to locate the mobile device 14. This information is acquired from the RADIUS server 28 using authentication processes described previously.

In any of the above-described scenarios whereby the mobile device is paged via the wireless network, when the call set-up message is sent to the mobile switching center in the wireless network, the message may includes a service option indicating that either packet data or voice over IP service is available. When the mobile device responds to the page, it can set up a data session with the designated network access server/ IWU/foreign agent 30A and either initiate a convention data session (e.g., file transfer), or if the mobile device has voice capability, initiate voice or other multimedia type of session with the remote terminal in accordance with known voice over IP protocols.

In one possible embodiment, the collection of the home agent 22, network access servers 30 and authorization server 28 are collectively managed or operated by wireless to IP network service provider and together provide a system for providing IP network access for a plurality of wireless devices. The home agent provides coordination for connecting the wireless devices to the IP network. The network access server/IWU 30 is connected to the home agent over a local area network. The network access server provides access for the mobile communications devices onto the local area network and IP, so as to enable bi-directional communication between the remote terminals on the network and the mobile devices. The authorization server is connected to the home agent and the network access server over the local area network. The authentication server maintains a table mapping IP addresses for the mobile communications devices to the IMSI/ESN numbers for the devices. When the home agent receives an IP packet containing an IP address assigned to one of the devices device from a remote user (e.g., terminal 10), it sends an access-request packet containing the IP address to the authentication server. If the authentication is successful, the authentication server responsively sends an access-accept packet including the IMSI/ESN number to the home agent 22. The home agent uses the identification information to locate, page and automatically connect the device via the network access server 30 to the IP network and thereby provide communication between the device and the remote user over the IP network in the manner described above.

Further details on a presently preferred implementation of the invention in an Interworking Unit (IWU) functioning as a network access server 30 will now be described in conjunction with FIGS. 2–6.

Figure 2:
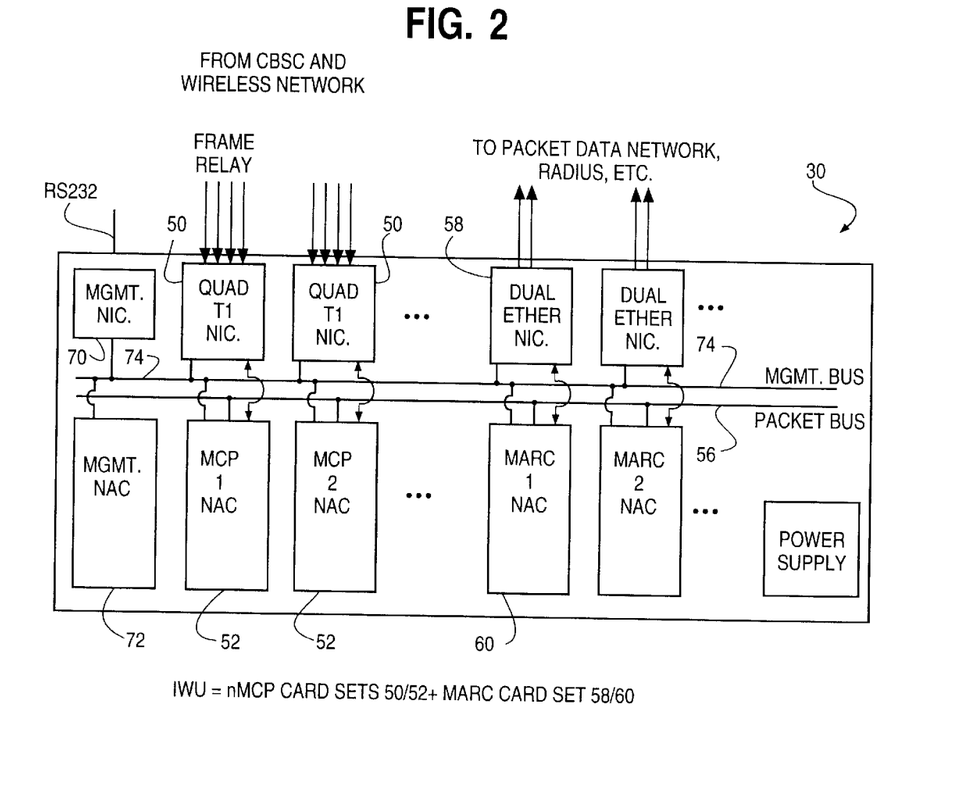
FIG. 2 is a block diagram of a network access server of FIG. 1A and 1B in which multiple InterWorking Units (IWU) are implemented within a single chassis.

FIG. 2 is a block diagram of a network access server 24 of FIG. 1 in which multiple InterWorking Units (IWU) are implemented within a single chassis. The network access server 24 is a high-density system, in that potentially hundreds of calls could be routed through the chassis at the same time. To accomplish this, the chassis consists of a plurality of frame relay line network interface cards 50. Each card 50 is configured to receive four T1 digital telephone lines, comprising twenty four time division multiplexed channels. The 96 channels are demultiplexed in the cards 50 and supplied to an associated Mobile Call Processor (MCP) card 52. The development of circuitry for the Quad T1 NIC cards 50 is within the ability of persons skilled in the art in view of the patent literature (see the above-referenced Walsh et al. '595 patent) or in view of analogous cards present in commercially available network access servers.

The mobile call processor cards 52 basically comprise a RISC-based computing platform that receives the demultiplexed data from the quad T1 NIC, and hands the data in packet form over to low level drivers that place the data on a 32-bit parallel packet bus 56. The packet bus 56 runs down the length of the chassis 24 and provides a means for communication between the various modules in the chassis. The computing platform in the MCP cards may also perform limited PPP co-processing in the manner described in the published European Patent Application of Daniel L. Schoo et al., publication number EP 0 878 070, which is incorporated by reference herein.

The packet data from the wireless network is transmitted along the packet bus 56 to a gateway interface module comprising a dual ethernet network interface card 58 and a Mobile Access Routing Card (MARC) card 60. The MARC card 60 is of the same basic design of the gateway card described in the above-referenced Walsh et al. '595 patent, in that it implements routing code and the associated protocol stacks in order to provide the necessary interfaces to the IAN/WAN IP packet switched data network. Router cards suitable for use as the platform for the MARC cards 60 are also commercially available from companies such as 3Com Corporation in its HiperARC™ routing card and Edgeserver™ card. Equivalent cards are also available from other companies in the industry, including Ascend Communications, Cisco Systems, and Lucent Technologies (successor to Livingston Enterprises, Inc.).

Figure 3:
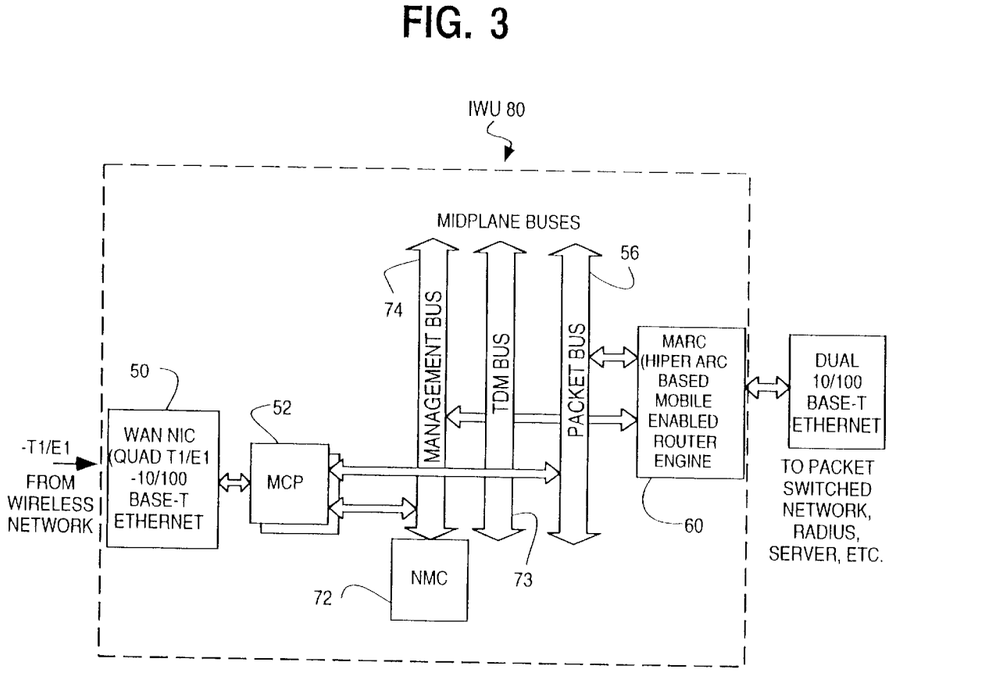
FIG. 3 is a block diagram of the modules and communications elements in the network access server of FIG. 2 that cooperate to perform the function of a single IWU.
Figure 6:
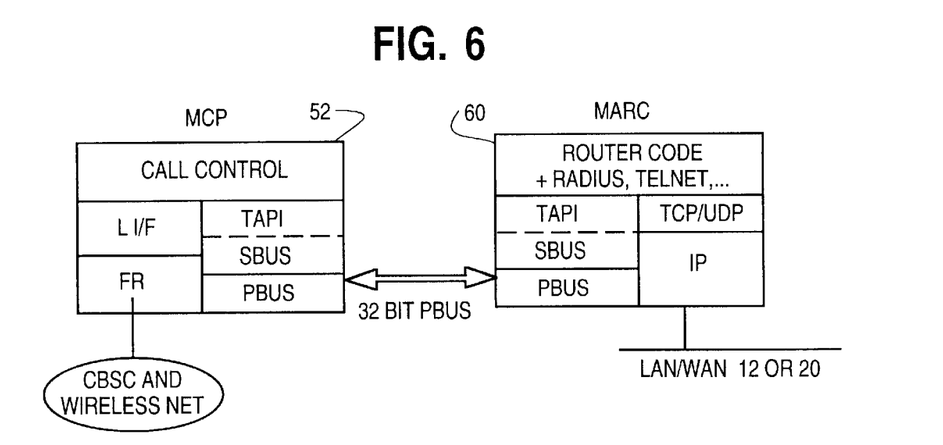
FIG. 6 is an illustration of the protocol architecture that is used for communications between the MCP card of FIG. 2 and the Mobile Access Router Card (MARC) of FIGS. 2 and 3.

FIG. 6 is an illustration of the protocol architecture that is used for communications between the MCP card of FIG. 2 and the Mobile Access Router Card (MARC) of FIGS. 2 and 3.

In the embodiment of FIG. 2, one set of cards 58 and 60 can support a number of different Quad T1 NIC/MCP card sets 50/52, in that the MARC cards 60 are high capacity cards capable of handling several hundred calls at once. The term IWU, as used herein, is intended to encompass the functionality of a card or device that performs the demultiplexing of the incoming channel data from the frame relay interface, a call processing module, and a gateway interface. It is thus apparent that multiple IWUs can be implemented in a single chassis, such as shown in the embodiment of FIG. 2 in which multiple quad T1 NIC/MCP cards sets and multiple dual ethernet NIC and MARC cards sets are installed in the same chassis.

The chassis of FIG. 2 further includes a management card set 70 and 72 and a management bus 74. The details of these elements are not particularly pertinent to the present invention and thus are omitted. The interested reader is directed to U.S. Pat. No. 5,438,614 to Christopher Rozman et al. for further details on a management system for a network access server.

FIG. 3 is a block diagram of the modules and communications elements in the network access server that cooperate to perform the function of a single IWU 80. The IWU 80 consists of a wide area network interface card 50 providing the interface to the frame relay/T1 line connected to the wireless network, a mobile call processing card 52, and a packet bus 56 coupling the mobile call processing card 52 to the MARC card 60. The network management card 72 and network management bus 74 are optional. Further, while the midplane bus complex includes a time division multiplexed (TDM) bus 73, it is also optional and not necessary or even used in the IWU architecture of FIGS. 2 and 3.

Figure 4:
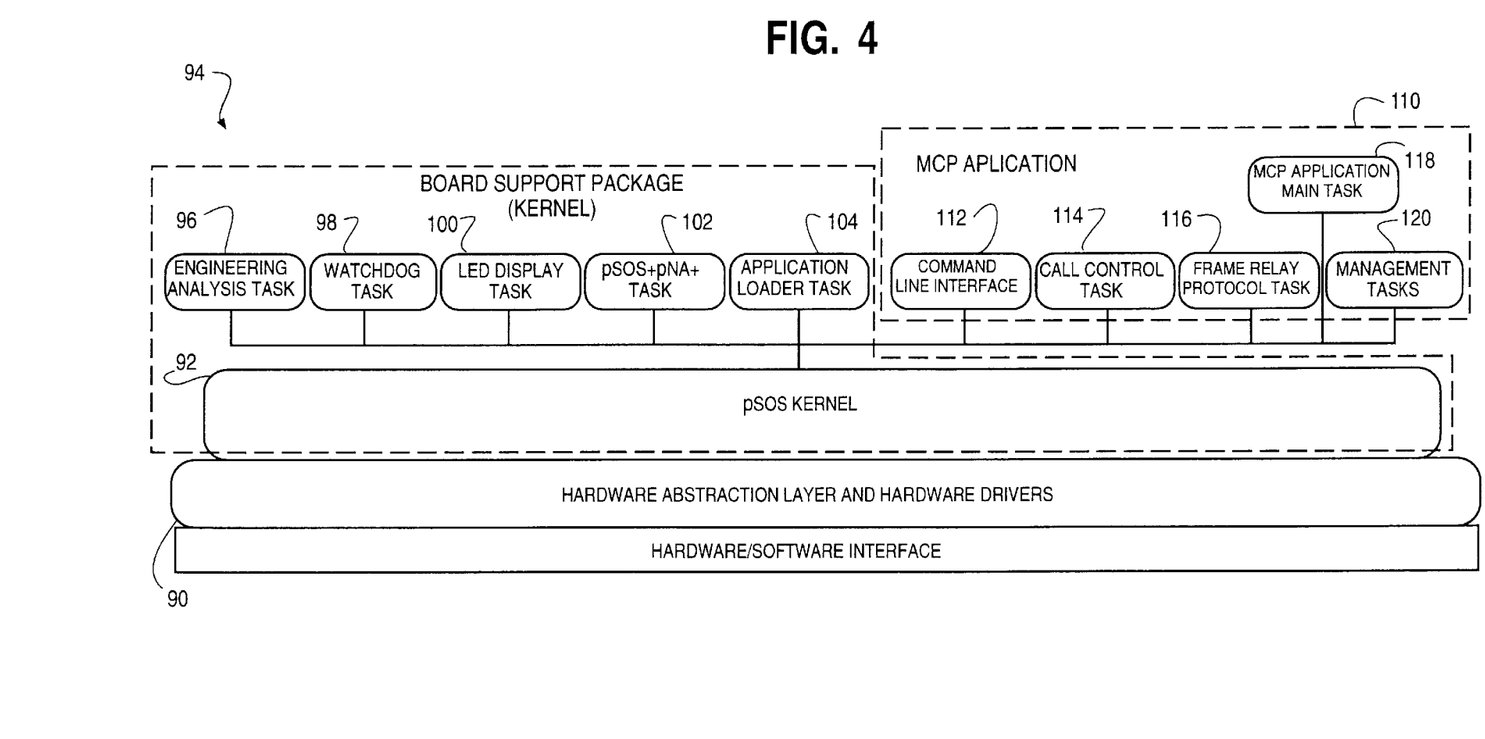
FIG. 4 is a diagram of the application software architecture for the mobile call processsor (MCP) card of FIGS. 2 and 3.

Referring now to FIG. 4, the software architecture of the mobile call processor card 52 is shown. Generally, the software and firmware running in the card includes the following layers: a hardware abstraction layer and device drivers 90, a multi-tasking real time operating system (pSOS+) 92, a board support package 94 comprising an engineering analysis task 96, a watchdog task 98, an LED display task 100, a pSOS+pNA+ task 102, and an application loader task 104. The software further includes an application layer 110, having a command line interface task 112, a call control task 114, a frame relay protocol task 116, an MCP application main task 118, and a management task 120.

Hardware Abstraction Layer and Device Drivers 90

Much of the hardware abstraction layer of the software is resident in a BIOS ROM module in the MCP card. This layer includes the software components that are responsible for initializing the hardware, setting up DRAM, initializing the basic software structures such as the stack and heap, performing general functions such as memory allocation, and accessing peripheral devices.

pSOS+ 92

This layer is composed of the real-time operating system being used for the MARC and MCP cards. It provides low-latency interrupt and context switching (as described in detail above), task creation and deletion, multitasking, and timer support. For additional information on the pSOS+ operating system, refer to the *pSOSystem Getting Started Manual*, *pSOSystem Concepts Manual*, the *pSOSystem User Manuals*, and the *pSOSystem Reference Guide*, available from Integrated Systems, Inc., 201 Moffett Park Drive, Sunnyvale Calif. 94089.

Application Layer 110 and Board support Package 94

These layers include all the tasks running on top of pSOS+ 92. This includes:

Engineering analysis task 96

Application loader task 104

LED display task 100

Watchdog task 98 pSOS+/pNA+ network task 102

The MCP application task 110, consisting of the following tasks: Frame Relay Protocol Task 116, Call Manager Task 114, Management Task 120, MCP Application Main Task 118 and Command Line Interface 112

Board Support Package 94

The Board Support Package (BSP) 94, also known as the kernel, is software that consists of the engineering analysis task, application loader task, LED display task, watchdog task, and the pSOS+/pNA+ network task. The details on these tasks are not particularly pertinent to the present invention. The kernel also contains utilities/libraries for accessing the flash file system and performing compression, and hardware drivers for serial and Ethernet ports. These utilities are accessible by the MCP application software since it is linked with the kernel's symbol table file.

The MCP application 110 of FIG. 4 will now be described in further detail in conduction with FIG. 5. The MCP application 110 provides configuration management and call processing functionality such as setup, tear-down, and mobile dormant mode management. The MCP application is composed of the following components:

MCP Application Main Task 118

Call Manager Task 114

Frame Relay Task/WAN interface 116

Command Line Interface 112

Network management task 120

Configuration management module 122

MCP Application Main Task 118

The MCP core kernel code 104 described earlier loads the MCP application 118 as if it were a single task. This "main" task 118 then oversees the creation of the other application "daughter" tasks (call manager, network management system, and frame relay) and handling of the watchdog timer. Once the daughter tasks have been started, this task has no active role in processing calls or data.

MCP Software Reliability Monitoring (Watchdog Timer Handling)

Once the MCP Application Main Task 118 has created the other tasks, it goes into a loop incrementing the software watchdog counter. This counter is checked periodically by a DSP-resident watchdog task 98 (FIG. 4), which runs at a higher priority than the MCP application 110. The MCP Application Main Task 118 runs at a priority lower than the other tasks; thus the fact that the MCP Application Main Task 118 can bump the software watchdog counter is an indication that the application software is not hung up somewhere. If the watchdog task 98 (FIG. 4) determines that a counter is not being updated, it begins a series of notifications starting with warnings to the console and concluding with a board restart if the condition persists for a specified period of time. Events are also generated to the network management card 72 (FIG. 2) which result in SNMP traps being sent to the management program for the chassis.

Call Control Task 114

The Call Control Task 114 is basically a relay between the central base station controller (CBSC) in the wireless network and the MARC card. It manages a set of associations between a frame relay task (Frame Relay Switched Virtual Circuit) to the CBSC and a system bus session to the MARC card. Once a path has been established the data is simply relayed between the Frame Relay task 116 and the System Bus (SBUS) Application Program Interface (API) 130.

Dynamic Call Database 132

The Call Control Task 114 maintains a list of dynamic call database (DCD) records. A DCD record is added to the list when a connection is setup with the CBSC and deleted when a session close timer expires or any other disconnect reason (normal or abnormal). Each record contains a collection of information on a per call basis, such as access information into frame relay task for communications with the CBSC, and with the MARC card; session Ids; the Mobile IMSI/MIN, and ESN numbers for the mobile device; the CBSC Number; a CBSC identifier for the last active packet data session; service configuration identifiers for the last active packet data session; mobility information such as the termination status of the mobile, as defined in section 6.7.1.3.2.4 of TIA/EIA/IS-95-B; Slot Cycle Index—Preferred slot cycle index of the mobile, as defined in section 6.7.1.3.2.4 of TIA/EIA/IS-95-B; the Packet Zone ID—Packet zone identifier of the CBSC that last supported an active packet data session with the mobile, as defined in section 7.7.2.3.2.13 of TIA/EIA/IS-95-B. Additional information that can be contained in the dynamic call database include the session State—Information on the status of a packet data session. The possibilities can be new data session, dormant data session, mobile initiated reactivated data session, and network initiated reactivated data session. Additional information can include:

Link Layer Status—Current status of the link layer connection. The supported values may be active and dormant.

Mobile Reactivation Status—The following parameters shall be used to monitor the status of packet data session:

Paging Status—Supported values shall be active and inactive. The default value shall be inactive.

Backoff Timer—Time to backoff before a retry on an unsuccessful attempt.

Retry Count—Number of retires attempted.

Page Response Timer—Time for the mobile to respond to a Page message.

Call Reference Value—a unique value assigned to each call.

The Dynamic Call Database records will be read-only and accessible through a set of library routines.

Call Control Module—Protocol Engine 115

The Call Control Module 115 (FIG. 5) handles call setups, tear downs, paging, and general mobile dormant mode management with the CBSC in the wireless network using the interface to the wireless network. The System Bus API 130 provides the signaling mechanism for setting up and tearing down packet data sessions (across the packet bus 56) with the MARC card 60 (FIG. 2). Once a packet data path between the CBSC and MARC card is established, the traffic is simply relayed between the two peers. The PPP Relay module 132 discussed in the next section is responsible for relaying the data.

Call Control States

In the call control module 115, each call has following major states:

IDLE

ACTIVE

DORMANT

The IDLE state represents no call or the call is down. The ACTIVE state represents the call is up and is able to send/receive data. The DORMANT state represents the call is up but is not able to transmit data because mobile is in sleep mode. A call needs to be reactivated before sending/receiving data over it. The MARC card buffers data that may have accumulated while dormant. When the call enters the ACTIVE state the MARC card will forward the buffered data to the MCP for transmission to the CBSC in the wireless network.

There are three sub-states of the DORMANT state:

Inactive

Paging

Paged

The Inactive state represents that the mobile is dormant with no paging to the mobile. The Paging state represents that the mobile is dormant and the IWU has sent the setup message to Base Station/Mobile Switching Center in the wireless network. The Paged state represents that the mobile is dormant and the BS/MSC has sent the paging message to mobile.

PPP Relay Module 134

The PPP relay module 134 performs the relay function. A significant performance improvement is realized by having the MCP card do the PPP framing/de-framing and CRC calculations for all PPP packets traversing the path. This feature is described in further detail in the published European patent application of Daniel L Schoo, et al., cited above. The PPP relay function can be enabled/disabled. If disabled the MARC card will perform the CRC calculation and framing/de-framing functions. The PPP offloading state in the DCD record determines whether the MCP performs this task or not.

MCP Hand-over

The MARC card 60 (FIG. 2) handles hand-overs when the mobile node moves about the wireless-network such that new PPP sessions are set up between different MCP cards within the same IWU. The MCP card handles hand-overs when the mobile moves from one T1 interface to another Ti interface on the same MCP NIC card 50 (FIG. 2). When a call setup message is received from the CBSC via the Frame Relay Task 116, the Call Control Module 115 performs a database lookup in the list of dynamic call database (DCD) records stored in the Dynamic Call Database 132. The DCD records are keyed on the IMSI/ESN numbers of the mobile node. If a record is found matching the IMSI received from the mobile and the status of the call indicates that the session is dormant, the Call Control Module 115 will activate the state of the call. A path between the frame relay task 116 and the existing system bus session (which must already exist if an IMSI is found in the DCD) is then established. PPP offloading state procedures and ACCM (negotiated encoding rules for control sequences) are then reapplied to the data path. At this point the data path is opened and the PPP relay module 134 transfers new data packets as usual.

Configuration And Statistics Databases

The Configuration Database Library 122 is a set of routines for accessing and storing configuration and statistics information for the MCP card. This library's main purpose is to abstract the actual implementation of the configuration storage from the tasks that access it. A key design consideration is the ability to accept dynamic configuration changes without affecting current calls. This is accomplished by implementing the concept of working configurations and a separate master configuration. When the configuration changes, only the master configuration is changed.

The configuration database 122 will be configurable at system initialization time and at any other time during the normal operations of the MCP card. The initial system configuration can be downloaded from a management program for the chassis. If no initial configuration download file is available the MCP will boot up with default set of parameters that will allow normal operations in the MCP. The configuration database can also be modified through different mechanisms: SNMP set/get requests via the network management card, Local command line interface over RS-232 port on the MCP network interface card 50 (FIG. 2), Management program configuration files download via the network management card, and Remote CLI via Telnet passthru mode on MARC card 60.

MCP Configuration parameters 140

Figure 5:
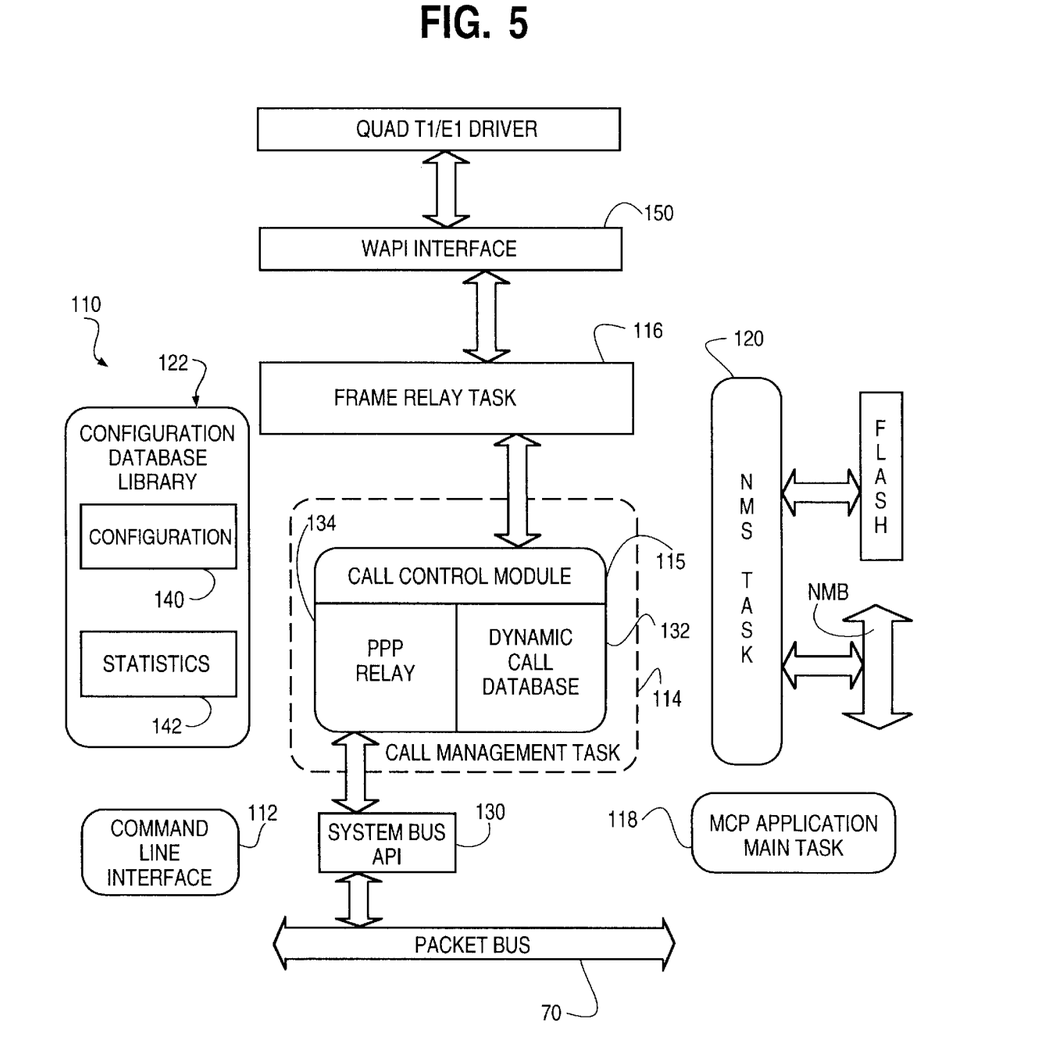
FIG. 5 is a further diagram of the software architecture for the MCP card of FIGS. 2 and 3.

The configuration parameters 140 of FIG. 5 include a set of configurable parameters, such as a list of the CBSC that are provision, including their number, and operational status.

Statistics 142

The MCP card provides statistics for performance monitoring and alarm generation. The statistics are polled by a management application periodically. Such statistics can include, for example, the number of packet bus frame overruns, packet bus CRC errors, packet bus clock losses, call control statistics, call statistics, such as the accumulated number of mobile originated calls, etc., and the CPU utilization in the MCP card.

Frame Relay Task/WAN Interface 116

The frame relay task provides the frame relay layer between the IWU and CBSC in the wireless network. Layer-2 LAPD I-frames will carry layer-3 T1.617 signaling and layer-3 data traffic.

The IWU supports single out-of-band signaling channel with independent data channels. Each call uses a single B channel for data. There will be only one switched virtual circuit per B channel. This task is also responsible for relaying the accounting information received from the MARC card to the base station and mobile switching center in the wireless network.

Layer 1

The physical layer connecting the MCP card to the wireless network is a T1 PRI with 24 DS0 channels. The first DS0 will be used for running LAPD protocol carrying layer 3 T.617 signaling over DLCI 0, which is equivalent to TEI 0 and SAPI 0. The rest of the 23 DS0 channels will be used to carry the mobile path traffic using LAPD UI frame. Each B-channel will be used to carry only one switched virtual circuit's data traffic.

Layer 2

The layer 2 LAPD I-frame will be used to carry layer 3 T1.617 signaling over SVC DLCI 0. DLCI 0 is mapped to TEI 0 and SAPI 0 in LAPD protocol. The layer 2 LAPD UI frame will be used to carry layer 3 user traffic.

Layer 3

The layer 3 protocol will be T1.617 with specific modifications:

The IWU will use and echo back Channel ID IE coming from SETUP message from CBSC.

1) End to end transit delay element will be echoed back by IWU.
2) Link layer core parameters element will be echoed back by IWU. The layer 3 messages will be carried over layer 2 LAPD DLCI 0.

WAPI Interface 150

The Wide area network Application Programming Interface (WAPI) is a custom interface for the Quad T1/E1 Network Inface Card 50 (FIG. 2) driver software. It provides a robust programming interface for allocating and managing resources on the Quad T1/E1 NIC card 50.

The WAPI 150 externalizes a set of functions that are accessible through the MCPs configuration library 122. All four facilities on the NIC card 50 can be configured through the configuration library. Each facility can be configured to support different signaling methods including: out-of-band signaling and in-band signaling, and support for fractional T1.

Support for enabling/disabling of resources at a facility and DS0 level is also provided. This can be initiated by the system administrator or by an event occurring in the system indicating a hardware failure.

Features of the MARC Card 60 Software (FIG. 2)

In the illustrated embodiment, the MARC card 60 application is a derivative of the existing software present on the HiperARC router or gateway card of the Total Control Enterprise Network Hub of 3Com Corporation. The MARC card terminates the PPP connections to the mobile station. From the MARC card point of view the MCP cards look like to ordinary modems, providing dial-in services. The difference is that the MCP can drop the connection to the mobile and leave the system bus connection over the packet bus to the MARC card established. The system bus session is torn down when any of the following events occur: the MARC receives a session-close timer event from the MCP, the RADIUS client receives a resource-reclaim request from RADIUS server, the MARC card receives a system bus connection request for a mobile that already has an SBUS connection established, or if certain error conditions are present.

Hand-over

The MARC card supports hand-overs by suspending existing system bus connections to MCP cards. A suspended system bus connection means that the connection to the MCP as well as the PPP context associated with it is left open. The connection is kept up until the MCP signals the MARC card to drop it. This can happen in four ways, excluding error conditions:

1) The MCP card session-close timer expires
2) The mobile station application drops its PPP connection
3) an intra-IWU hand-over (hand-over between MCP card) occurs; or
4) an inter-IWU hand-over occurs with the RADIUS server sending a resource-reclaim request to the MARC card.

Hand-overs within an MCP are handle locally by that MCP card (i.e. the MCP will use the same system bus connection it had when the mobile went dormant).

The session-close timer in Internet and Intranet services is the maximum time a mobile can remain in the dormant state. When the timer pops the MCP signals the MARC card resulting in the PPP session being terminated and the system bus connection being released. All resources associated with the connection are reclaimed. The call is released.

The second case is PPP connection dropping. The entire call is removed from existence. The call is released.

In the third case the MCP will signal the MARC that a new call is pending. The MARC card will search its database of IMSIs to determine if a system bus/PPP session already exists for this mobile. If it does the old system bus connection is dropped and a new one is established with the MCP. The existing PPP context or "state" is transferred to the new SBUS connection and PPP traffic flows as if nothing ever happened. This process is described in further detail previously.

In the fourth case a mobile went dormant and then "awoke" at another IWU (i.e., at another MARC card in the chassis or in a different chassis). The RADIUS server will receive an access-request message from the new MARC card. If the RADIUS server determines that the mobile already has authenticated at another MARC, the RADIUS server will send a resource-reclaim to the old MARC and then send an access-accept to the new MARC. This tears down the PPP connection on the old MARC card and establishes a new PPP session from the new MARC card to the mobile. The RADIUS server ensures that the same IP address is assigned to the mobile after moving from one MARC card to another.

IMSI Database

As mentioned above the MARC card must maintain a database of records to support hand-overs between MCP cards. Each record will contain the following: IMSI/ESN numbers, System bus session ID, Username and IP address assigned to calling entity.

RADIUS Client

The MARC Card implements a RADIUS client application which will support the standard RADIUS features set forth in Request for Comments (RFC) 2058 and 2059, as well as resource management and interim accounting messaging that includes:

Resource-Query-Request
Resource-Query-Response
Resource-Reclaim-Request
Resource-Reclaim-Response
Nas-Reboot-Request
Interim-Accounting RADIUS Accounting All RADIUS accounting is done through the MARC card RADIUS client application. The MARC may require additional accounting message attributes. The exact set of accounting attributes is highly dependent on how billing is done by the wireless service providers, such as whether dormant billing is being performed. The following attributes may be added to the MARC card RADIUS client application:

Active Session (which means the mobile has an active air traffic channel)
Active Session Start Time Active Session End Time Active Session Direction (i.e. mobile-originated or mobile terminated)

Active Session Received Byte Count

Active Session Transmitted Byte Count

Interim Accounting

Accounting is started when a new connection is established and stopped when the connection is released. These two messages delimit the entire accounting session. Interim accounting messages are sent on a periodic basis. The MARC card will send the messages every 'X' minutes and the RADIUS server will translate these into start and stop messages.

IWU—Wide Area Push (WAP) Service Support

The IWU architecture of FIGS. 1 and 2 can be used to support a feature by which a terminal on the IP network can initiate a paging of the wireless terminal via the IWU and thereby initiate a communications session with the wireless terminal, without having to have the wireless device be previously registered with the wireless network. In order to support non-registered mobile push services, each service provider will designate one of the deployed IWUs as a master. The master IWU MARC card will sniff all Adresss Resolution Protocol (ARP) requests it receives over the IP network. If the entry is found processing continues as usual. If no entry is found the MARC will send an access-request to the RADIUS server with the username set to IP-Address@domain, where "IP-Address" is the address being sniffed and "domain" is the domain of the WAP Home RADIUS server. The domain is a new configurable parameter set in the master IWU only. The home RADIUS server will return the IMSI and ESN in the call-id and call-number attributes of the access-accept packet. This information is sent to the MCP, which then pages the mobile device via the wireless network.

When the device receives the page, it then knows that a terminal on the IP network is trying to reach it. When the device responds to the page, a connection through the wireless network, an IWU and packet-switched network is initiated. Typically the connection will go through one of the other network access servers on the LAN. The network access server receiving the incoming call from the wireless device notifies a mobile node location server that it has the call (e.g., by an ARP message), providing it with the IP address for the mobile node, and this information is placed in the mapping table maintained by the mobile node location server. The new IP address is forwarded to the home agent to enable the packet from the remote terminal to be routed to the network access server receiving the response to the page. At this point the communication between the wireless device and the terminal on the network may be initiated. The above process is described in further detail above.

While presently preferred and alternative embodiments of the invention have been described with particularity, persons skilled in the art will appreciate that numerous modifications and alternative implementations may be employed without departure from the spirit and scope of the invention. This true scope and spirit of the invention is to be defined by the appended claims, interpreted in light of the foregoing.

We claim:

1. A method of finding a mobile wireless communications device when an Internet Protocol (IP) packet from a remote user over an IP network is sent to said device, comprising the steps of:

receiving, at a home agent associated with a wireless communications network, said IP packet, said IP packet including an IP address assigned to said device;

sending an access-request packet from said home agent to an authentication server, said access-request packet containing said IP address;

maintaining a table at said authentication server mapping said IP address for said device to an identification number uniquely associated with said device, said authentication server sending an access-accept packet to said home agent in the event that said device is authorized to receive said IP packet, in which case said access-accept packet includes said identification information;

in response to the receipt of said access-accept packet, said home agent cooperating with a mobile node location server to either locate said device in the event that the current location of said mobile device is known or cause a page of said device in the event that the current location of said device is not known to thereby alert said device that an incoming call has been received to thereby prompt said device to initiate communication between said device and said remote user.

2. The method of claim 1, wherein said identification number comprises an International Mobile Subscriber Identity (IMSI) number.

3. The method of claim 2, wherein said identification number further comprises an Electronic Serial Number (ESN) associated with said communications device.

4. The method of claim 1, wherein said mobile communications device comprises a laptop computer.

5. The method of claim 1, further comprising the step of paging said device in the event that said device is authorized to receive said IP packet.

6. The method of claim 5, wherein said device is paged through said wireless network.

7. The method of claim 5, wherein said device is paged through a Signaling System 7 (SS7) network.

8. The method of claim 1, wherein said authorization server comprises a RADIUS server.

9. The method of claim 8, wherein said authorization server is connected to said home agent via a local area network.

10. The method of claim 9, wherein said home agent further comprises a router coupled between said local area network and a wide area network.

11. The method of claim 8, wherein the method further comprises the step of initiating a page of said device with a network access server connected to said home agent and said RADIUS server over a local area network, and wherein said mobile device becomes connected to said IP network via said network access server in response to said page.

* * * * *